United States Patent
Park

(10) Patent No.: US 10,194,419 B2
(45) Date of Patent: Jan. 29, 2019

(54) METHOD AND APPARATUS FOR CONTROLLING ADAPTIVE REPORTING IN TDD ENVIRONMENT

(71) Applicant: Apple Inc., Cupertino, CA (US)

(72) Inventor: Dong Hyun Park, Seoul (KR)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/910,490

(22) PCT Filed: Aug. 8, 2014

(86) PCT No.: PCT/KR2014/007404
§ 371 (c)(1),
(2) Date: May 10, 2016

(87) PCT Pub. No.: WO2015/020492
PCT Pub. Date: Feb. 12, 2015

(65) Prior Publication Data
US 2016/0255608 A1    Sep. 1, 2016

(30) Foreign Application Priority Data

Aug. 9, 2013    (KR) .................... 10-2013-0094942

(51) Int. Cl.
*H04W 72/00*    (2009.01)
*H04W 72/04*    (2009.01)
(Continued)

(52) U.S. Cl.
CPC .......... *H04W 72/04* (2013.01); *H04L 5/0087* (2013.01); *H04L 5/0096* (2013.01); *H04L 5/14* (2013.01);
(Continued)

(58) Field of Classification Search
CPC ......... H04W 72/0446; H04W 72/0486; H04W 72/04; H04W 72/042; H04W 24/10;
(Continued)

(56) References Cited

U.S. PATENT DOCUMENTS

2010/0214937 A1*  8/2010  Chen ................. H04L 43/00
                                                        370/252
2012/0002568 A1   1/2012  Tiirola et al.
(Continued)

FOREIGN PATENT DOCUMENTS

KR    10-2012-0037948    4/2012
KR    10-2012-0127674    11/2012
(Continued)

OTHER PUBLICATIONS

Huawei, "Channel state information feedback for the advanced antenna technologies in LTE-A" 3GPP TSG RAN WG1 meeting #56bis, Mar. 23-27, 2009, p. 1-3, Seoul, Korea.
(Continued)

*Primary Examiner* — Mohamed A Kamara
(74) *Attorney, Agent, or Firm* — Meyertons, Hood, Kivlin, Kowert & Goetzel, P.C.

(57) ABSTRACT

A method for enabling a base station to control adaptive reporting in a TDD environment according to one embodiment of the present invention comprises the steps of: transmitting, from a base station to a terminal, an information element including reporting-setting information comprising reporting cycle and reporting offset of channel state information; transmitting information of a UL-DL setting change to the terminal; and receiving the channel state information by using the reporting cycle and the reporting offset of the reporting-setting information corresponding to the changed UL-DL setting.

20 Claims, 12 Drawing Sheets

(51) Int. Cl.
  *H04L 5/00* (2006.01)
  *H04L 5/14* (2006.01)
(52) U.S. Cl.
  CPC .......... *H04L 5/1469* (2013.01); *H04L 5/0053* (2013.01); *H04L 5/0057* (2013.01); *H04W 72/042* (2013.01)
(58) Field of Classification Search
  CPC ..... H04W 16/14; H04W 36/30; H04W 4/005; H04W 4/06
  See application file for complete search history.

(56) References Cited

U.S. PATENT DOCUMENTS

| | | | |
|---|---|---|---|
| 2012/0134275 A1 | 5/2012 | Choi et al. | |
| 2012/0295650 A1* | 11/2012 | Futaki ............... | H04W 52/0216 455/507 |
| 2013/0142134 A1 | 6/2013 | Zhu et al. | |
| 2013/0188516 A1* | 7/2013 | He ....................... | H04W 28/16 370/254 |
| 2013/0223298 A1 | 8/2013 | Ahn et al. | |
| 2013/0301489 A1* | 11/2013 | Sirotkin .................. | H04W 4/90 370/280 |
| 2014/0092787 A1* | 4/2014 | Han .................. | H04W 52/0258 370/280 |
| 2014/0293953 A1* | 10/2014 | Seo ....................... | H04L 5/0048 370/329 |
| 2014/0334391 A1* | 11/2014 | Khoshnevis ...... | H04W 72/0413 370/329 |
| 2015/0250017 A1* | 9/2015 | Ingale .................. | H04B 7/2615 370/280 |
| 2015/0281994 A1* | 10/2015 | Pedersen ............... | H04W 24/10 370/252 |

FOREIGN PATENT DOCUMENTS

| | | |
|---|---|---|
| KR | 10-2013-0071485 | 6/2013 |
| WO | WO 2013042991 A1 * | 3/2013 |

OTHER PUBLICATIONS

International Search Report dated Dec. 8, 2014, in International Patent Application No. PCT/KR2014/007404.

Written Opinion of the International Search Authority, dated Dec. 8, 2014, in International Patent Application No. PCT/KR2014/007404.

* cited by examiner

*FIG.11*

```
CQI-ReportPeriodic ::=    CHOICE {
    release               NULL,
    setup                 SEQUENCE {
        cqi-PUCCH-ResourceIndex    INTEGER (0..1185),
        cqi-pmi-ConfigIndex_0      INTEGER (0..1023),
        cqi-pmi-ConfigIndex_1      INTEGER (0..1023),
        ...
        cqi-pmi-ConfigIndex_k      INTEGER (0..1023),
        cqi-FormatIndicatorPeriodic    CHOICE {
            widebandCQI        NULL,
            subbandCQI         SEQUENCE {
                k              INTEGER (1..4)
            }
        },
        ri-ConfigIndex_0           INTEGER (0..1023)    OPTIONAL,
        ri-ConfigIndex_1           INTEGER (0..1023)    OPTIONAL,
        ...
        ri-ConfigIndex_k           INTEGER (0..1023)    OPTIONAL,
        simultaneousAckNackAndCQI  BOOLEAN
    }
}
```

1110 (cqi-PUCCH-ResourceIndex ... subbandCQI block)

1120 (ri-ConfigIndex_0 ... ri-ConfigIndex_k block)

FIG.12

```
CQI-ReportPeriodic ::=    CHOICE {
    release             NULL,
    setup               SEQUENCE {
        cqi-PUCCH-ResourceIndex INTEGER (0..1185),
        cqi-pmi-ConfigIndex_r12   SEQUENCE (size (1..k)) of REPORT_ConfigType,    ←1210
        cqi-FormatIndicatorPeriodic   CHOICE {
            widebandCQI         NULL,
            subbandCQI          SEQUENCE {
                k               INTEGER (1..4)
            }
        },
        ri-ConfigIndex_r12      SEQUENCE (size (1..k)) of REPORT_ConfigType,    ←1220
        simultaneousAckNackAndCQI BOOLEAN
    }
}

REPORT_ConfigType ::= INTEGER (0..1023)    ←1230
```

METHOD AND APPARATUS FOR CONTROLLING ADAPTIVE REPORTING IN TDD ENVIRONMENT

CROSS-REFERENCE TO RELATED APPLICATIONS

This application is the National Stage Entry of International Application PCT/KR2014/007404, filed on Aug. 8, 2014, and claims priority from and the benefic of Korea Patent Application No. 10-2013-0094942, filed on Aug. 9, 2013, which are hereby incorporated by reference for all purposes as if fully set forth herein.

BACKGROUND

Field

The present invention relates to a method and an apparatus for controlling adaptive reporting in a Time Division Duplexing (TDD) environment and, more particularly, to a method and an apparatus for performing a control operation for adaptively reporting a periodic Channel Quality Indicator (CQI)/Precoding Matrix Indicator (PMI).

Discussion of the Background

With the progress of communication systems, consumers such as companies and individuals have used a wide variety of wireless terminals.

In current mobile communication systems affiliated with Third Generation Partnership Project (3GPP), for example, Long Term Evolution (LTE), LTE-Advanced (LTE-A), and the like, as a high-speed and high-capacity communication system capable of transmitting and receiving various data such as images and wireless data beyond voice-oriented services, it is required to develop a technology capable of transmitting a large amount of data coming close to that of a wired communication network. In addition, an appropriate error detection scheme in which system performance can be improved by minimizing information loss and increasing system transmission efficiency, becomes an essential element.

Also, in many current communication systems, various Reference Signals (RSs) are used to provide information on a communication environment and the like to a counterpart apparatus in uplink or downlink. Further, information for identifying a status of a channel, or coding information is transmitted at a predetermined cycle.

SUMMARY

The present invention proposes a method for performing a control operation for adaptively reporting a periodic CQI/PMI for an LTE TDD enhanced Interference Management and Traffic Adaptation (eIMTA) technique and an apparatus implementing the same.

An aspect of the present invention is to implement a method and an apparatus for allowing periodic CQI/PMI reporting, which is based on a Radio Resource Control (RRC) configuration, to be achieved with respect to a dynamically-changed TDD Uplink (UL)-Downlink (DL) configuration (or reconfiguration).

In accordance with an aspect of the present invention, there is provided a method for controlling adaptive reporting by a base station in a TDD environment. The method includes: transmitting an information element including reporting configuration information including a reporting periodicity and a reporting offset of channel status information, from the base station to a user equipment; transmitting information on an Uplink (UL)-Downlink (DL) configuration change, from the base station to the user equipment; and receiving the channel status information by using a reporting periodicity and a reporting offset of the reporting configuration information corresponding to the changed UL-DL configuration, by the base station.

In accordance with another aspect of the present invention, there is provided a method for controlling adaptive reporting by a user equipment in a TDD environment. The method includes: receiving an information element including reporting configuration information including a reporting periodicity and a reporting offset of channel status information, from a base station by the user equipment; receiving information on an Uplink (UL)-Downlink (DL) configuration change, from the base station by the user equipment; and transmitting the channel status information by using a reporting periodicity and a reporting offset of the reporting configuration information corresponding to the changed UL-DL configuration, by the user equipment.

In accordance with still another aspect of the present invention, there is provided a base station for controlling adaptive reporting in a TDD environment. The base station may include: a control unit for generating an information element including reporting configuration information including a reporting periodicity and a reporting offset of channel status information; a transmission unit for transmitting the generated information element to a user equipment, and transmitting, to the user equipment, information on an Uplink (UL)-Downlink (DL) configuration change of the user equipment; and a reception unit for receiving a signal from the user equipment, wherein the control unit may control the reception unit to receive indicator information of the user equipment by using a reporting periodicity and a reporting offset of the reporting configuration information corresponding to the changed TDD UL-DL configuration.

In accordance with yet another aspect of the present invention, there is provided a user equipment for controlling adaptive reporting in a TDD environment. The user equipment includes: a reception unit for receiving, from a base station, an information element including reporting configuration information including a reporting periodicity and a reporting offset of channel status information, and receiving, from the base station, information on an Uplink (UL)-Downlink (DL) configuration change; a transmission unit for transmitting a signal to the base station; and a control unit for controlling the transmission unit to transmit the channel status information by using a reporting periodicity and a reporting offset of the reporting configuration information corresponding to the changed UL-DL configuration.

When the present invention is applied, periodic CQI/PMI reporting, which is based on an RRC configuration, can be performed according to a dynamically-changed TDD UL-DL configuration.

BRIEF DESCRIPTION OF THE DRAWINGS

FIGS. 11 and 12 are views each illustrating a configuration example of a CQI-ReportPeriodic according to an embodiment of the present invention.

DETAILED DESCRIPTION OF THE ILLUSTRATED EMBODIMENTS

Figure 1:
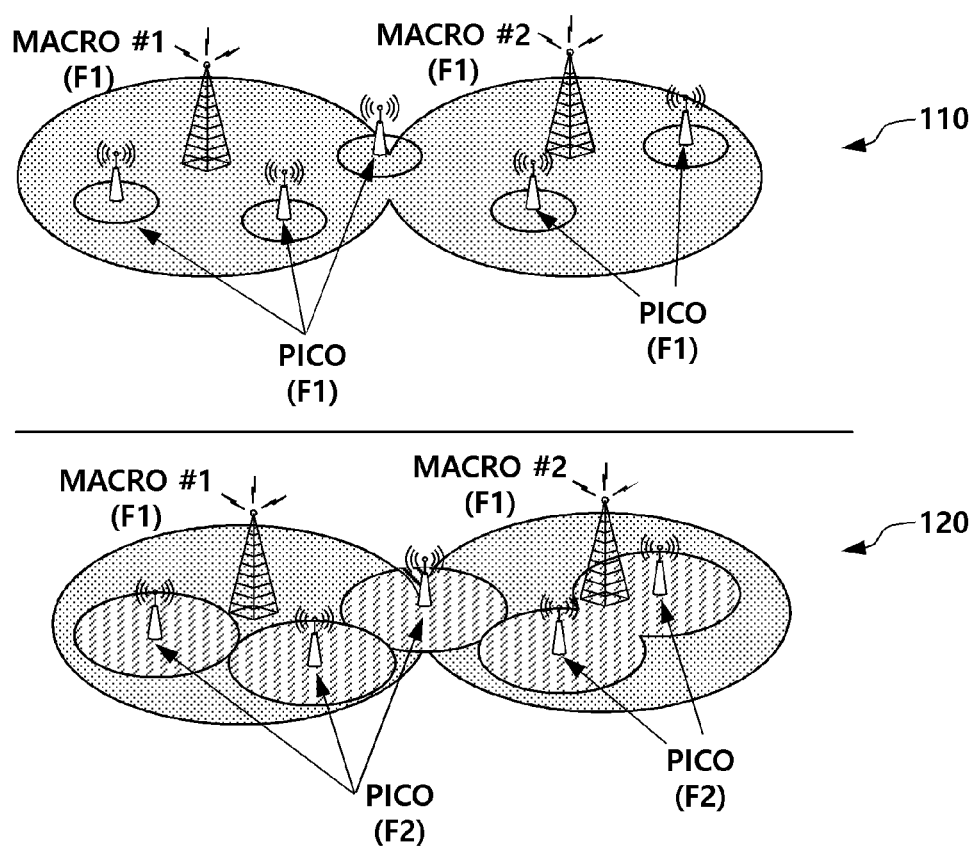
FIG. 1 is a view illustrating an eIMTA deployment scenario, to which the present invention may be applied.

Hereinafter, exemplary embodiments of the present invention will be described in detail with reference to the exemplary drawings. In the following description, the same components will be designated by the same reference numerals although they are shown in different drawings. Further, in the following description of the present invention, a detailed description of known functions and configurations incorporated herein will be omitted when it may make the subject matter of the present invention rather unclear.

The wireless communication system may include a User Equipment (UE) and a Base Station (BS or an eNB). Throughout the specifications, the user equipment may be an inclusive concept indicating a user terminal utilized in wireless communication, including a UE (User Equipment) in WCDMA, LTE, HSPA, and the like, and an MS (Mobile station), a UT (User Terminal), an SS (Subscriber Station), a wireless device, and the like in GSM.

The base station 20 or a cell, may generally refer to a station where communication with the user equipment 10 is performed, and may also be referred to as a Node-B, an eNB (evolved Node-B), a Sector, a Site, a BTS (Base Transceiver System), an Access Point, a Relay Node, and the like.

That is, the base station 20 or the cell may be construed as an inclusive concept indicating a portion of an area covered by a BSC (Base Station Controller) in CDMA, a NodeB in WCDMA, an eNB or a sector (site) in LTE, and the like, and the concept may include various coverage areas, such as a megacell, a macrocell, a microcell, a picocell, a femtocell, a communication range of a relay node, and the like.

In the specification, the user equipment and the base station are used as two (uplink or downlink) inclusive transceiving subjects to embody the technology and technical concepts described in the specifications, and may not be limited to a predetermined term or word. As used herein, the user equipment may be called a terminal for short.

In a system, such as LTE and LTE-A, to which the present invention may be applied, a standard may be developed by configuring an uplink and a downlink based on a single carrier or a pair of carriers. The uplink and the downlink may transmit control information through a control channel, such as a PDCCH (Physical Downlink Control CHannel), PCFICH (Physical Control Format Indicator CHannel), PHICH (Physical Hybrid ARQ Indicator CHannel), PUCCH (Physical Uplink Control CHannel), and the like, and may be configured as a data channel, such as PDSCH (Physical Downlink Shared CHannel), PUSCH (Physical Uplink Shared CHannel), and the like, so as to transmit data.

Abbreviations used in this specification are described as follows.

PCell: Primary serving cell
SCell: Secondary serving cell
RS: Reference Signal
CRS: Common Reference Signal
DM-RS: DeModulation Reference Signal
eIMTA: enhanced Interference Management and Traffic Adaptation
CIF: Carrier Indicator Field
CQI: Channel Quality Indicator
PMI: Precoding Matrix Indicator
RI: Rank Indicator In this specification, information or an indicator, which indicates a channel status of a DL channel such as a CQI/PMI and an RI, is referred to as "channel status information" or a "channel information indicator." Also, in this specification, an operation of a UE for transmitting the channel status information or the channel information indicator is referred to as "reporting." For example, an operation of the UE for transmitting a CQI/PMI is referred to as "CQI/PMI reporting," and an operation of the UE for transmitting an RI is referred to as "RI reporting."

Uplink transmission and downlink transmission may be performed based on a TDD (Time Division Duplex) scheme that performs transmission based on different times, or based on an FDD (Frequency Division Duplex) scheme that performs transmission based on different frequencies. Meanwhile, a timepoint of a downlink and a timepoint of an uplink may be distinguished in TDD, and when various TDD configurations exist, timepoints may be varied.

Table 1 below is a table showing a TDD configuration. It can be noted that respective UL-DL configurations have different UL-DL subframe transmission timings.

TABLE 1

| | | UL-DL configurations | | | | | | | | | |
|---|---|---|---|---|---|---|---|---|---|---|---|
| Uplink-downlink configuration | Downlink-to-Uplink Switch-point periodicity | Subframe number | | | | | | | | | |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, an area indicated by D represents DL and an area indicated by U represents UL, in a radio frame corresponding to 10 subframes. S represents a special subframe that is switched from a DL to a UL on the basis of a DL-to-UL switch-point periodicity.

Table 2 below shows the value of a DL association set index K in TDD. K has $\{k_0, k_1, \ldots, k_{M-1}\}$. Here, elements of the set K are values used to indicate a DL subframe corresponding to a UL subframe n−k, as shown in Table 2, and the number of multiple k values associated with one UL subframe is defined as M.

TABLE 2

| UL-DL Configuration | DL association set index K in TDD: {k₀, k₁, . . . , k_{M−1}} Subframe n | | | | | | | | |
|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In a UL frame n, response information to a DL signal, DL information, or the like may be transmitted through a DL subframe (a subframe n–k) having a subframe number before a k value included in K. Table 2 signifies a Physical Downlink Shared CHannel (PDSCH) Acknowledgement/Negative-acknowledgement (Ack/Nack) timing.

Meanwhile, the setting of a reporting periodicity and a reporting offset, to which the value of an $I_{CQI/PMI}$ signaled via RRC is mapped, follows Table 3 below. An $I_{CQI/PMI}$ which indicates the reporting periodicity and the reporting offset is an example of reporting configuration information. The reporting configuration information is information indicating a reporting periodicity and a reporting offset required when the UE reports CQI/PMI information or RI information to the BS. An $I_{RI}$ described below is also an example of the reporting configuration information.

TABLE 3

Mapping of $I_{CQI/PMI}$ to $N_{pd}$ and $N_{OFFSET}$ (CQI of TDD)

| $I_{CQI/PMI}$ | Value of $N_{pd}$ | Value of $N_{OFFSET,CQI}$ |
|---|---|---|
| $I_{CQI/PMI}$ = 0 | 1 | $I_{CQI/PMI}$ |
| 1 ≤ $I_{CQI/PMI}$ ≤ 5 | 5 | $I_{CQI/PMI}$ - 1 |
| 6 ≤ $I_{CQI/PMI}$ ≤ 15 | 10 | $I_{CQI/PMI}$ - 6 |
| 16 ≤ $I_{CQI/PMI}$ ≤ 35 | 20 | $I_{CQI/PMI}$ - 16 |
| 36 ≤ $I_{CQI/PMI}$ ≤ 75 | 40 | $I_{CQI/PMI}$ - 36 |
| 76 ≤ $I_{CQI/PMI}$ ≤ 155 | 80 | $I_{CQI/PMI}$ - 76 |
| 156 ≤ $I_{CQI/PMI}$ ≤ 315 | 160 | $I_{CQI/PMI}$ - 156 |
| 316 ≤ $I_{CQI/PMI}$ ≤ 1023 | | Reserved |

The value of a periodicity to be applied to a serving cell c for periodic CQI/PMI reporting in TDD is determined according to a TDD UL-DL configuration of a PCell. When TDD UL-DL configurations of the PCell are {0, 1, 3, 4, 6}, a reporting periodicity may be set to be $N_{pd}$=1. In this case, the periodicity is equal to 1 ms, and thus, CQI/PMI reporting is performed in all UL subframes.

Meanwhile, when TDD UL-DL configurations of the PCell are {0, 1, 2, 6}, the reporting periodicity may be set to be $N_{pd}$=5. Alternatively, the reporting periodicities may be set to be $N_{pd}$={10, 20, 40, 80, 160} regardless of the TDD UL-DL configuration of the PCell.

Mapping values for reporting of Rank Indication (RI) in TDD follow a report configuration in Table 4 below.

TABLE 4

Mapping of $I_{RI}$ to $M_{RI}$ and $N_{OFFSET,RI}$

| $I_{RI}$ | Value of $M_{RI}$ | Value of $N_{OFFSET,RI}$ |
|---|---|---|
| 0 ≤ $I_{RI}$ ≤ 160 | 1 | — $I_{RI}$ |
| 161 ≤ $I_{RI}$ ≤ 321 | 2 | — ($I_{RI}$ - 161) |

TABLE 4-continued

Mapping of $I_{RI}$ to $M_{RI}$ and $N_{OFFSET,RI}$

| $I_{RI}$ | Value of $M_{RI}$ | Value of $N_{OFFSET,RI}$ |
|---|---|---|
| 322 ≤ $I_{RI}$ ≤ 482 | 4 | — ($I_{RI}$ - 322) |
| 483 ≤ $I_{RI}$ ≤ 643 | 8 | — ($I_{RI}$ - 483) |
| 644 ≤ $I_{RI}$ ≤ 804 | 16 | — ($I_{RI}$ - 644) |
| 805 ≤ $I_{RI}$ ≤ 965 | 32 | — ($I_{RI}$ - 805) |
| 966 ≤ $I_{RI}$ ≤ 1023 | | Reserved |

Parameters, that the BS indicates for the above-described CQI/PMI report and RI report, indicate cqi-pmi-ConfigIndex ($I_{CQI/PMI}$) or ri-ConfigIndex ($I_{RI}$) to each serving cell in the case of TM 1-9 through higher layer signaling, or indicate cqi-pmi-ConfigIndex ($I_{CQI/PMI}$) or ri-ConfigIndex ($I_{RI}$) to each Channel Status Information (CSI)-process of each serving cell in the case of TM 10 through higher layer signaling. Values of a CQI/PMI report periodicity $N_{pd}$ and offset $N_{OFFSET,CQI}$, which enable the identification of a subframe to perform reporting, are derived by applying the parameters and Table 3. Similarly, the RI report also indicates values of a periodicity $M_{RI}$ and a relative offset $N_{OFFSET,RI}$ on the basis of the value of ri-ConfigIndex ($I_{RI}$) and Table 4.

When one or more CSI-subframe sets are configured for the UE, the CSI-subframe sets are configured as "cqi-pmi-ConfigIndex and ri-ConfigIndex for subframe set 1" and "cqi-pmi-ConfigIndex2 and ri-ConfigIndex2 for subframe set 2" corresponding to the respective subframe sets. In addition, in the case of TM 10, the above-described parameters may be configured in each CSI-process.

Relevant reporting instances (i.e., a subframe in which reporting occurs) according to a reporting mode of the UE derive a subframe, in which a CQI/PMI or an RI is reported, by using the Equation below. The following example is an example in a case where a wideband CQI/PMI is configured. Specifically, a reporting instance for the wideband CQI/PMI is subframes satisfying Equation 1 below.

$$(10 \times n_f + \lfloor n_s/2 \rfloor - N_{OFFSET,CQI}) \bmod(N_{pd}) = 0 \quad \text{[Equation 1]}$$

When RI reporting is configured, a reporting interval of the RI reporting is a value obtained by multiplying $M_{RI}$ by $N_{pd}$, and a reporting instance is subframes satisfying Equation 2 below.

$$(10 \times n_f + \lfloor n_s/2 \rfloor - N_{OFFSET,CQI} - N_{OFFSET,RI}) \bmod (N_{pd} \cdot M_{RI}) = 0 \quad \text{[Equation 2]}$$

In addition to the above-described Equations, another Equation may be applied according to another reporting mode.

Meanwhile, a DL-reference UL-DL configuration according to TDD UL-DL configurations of a PCell and an SCell for a serving cell may be configured as in Table 5 below.

TABLE 5

DL-reference UL-DL configuration according to UL/DL configurations of PCell and SCell for serving cell

| Set # | (Primary cell UL/DL configuration, Secondary cell UL/DL configuration) | DL-reference UL/DL configuration |
|---|---|---|
| Set 1 | (0, 0) | 0 |
| | (1, 0), (1, 1), (1, 6) | 1 |
| | (2, 0), (2, 2), (2, 1), (2, 6) | 2 |
| | (3, 0), (3, 3), (3, 6) | 3 |
| | (4, 0), (4, 1), (4, 3), (4, 4), (4, 6) | 4 |
| | (5, 0), (5, 1), (5, 2), (5, 3), (5, 4), (5, 5), (5, 6) | 5 |
| | (6, 0), (6, 6) | 6 |
| Set 2 | (0, 1), (6, 1) | 1 |
| | (0, 2), (1, 2), (6, 2) | 2 |
| | (0, 3), (6, 3) | 3 |
| | (0, 4), (1, 4), (3, 4), (6, 4) | 4 |
| | (0, 5), (1, 5), (2, 5), (3, 5), (4, 5), (6, 5) | 5 |
| | (0, 6) | 6 |
| Set 3 | (3, 1), (1, 3) | 4 |
| | (3, 2), (4, 2), (2, 3), (2, 4) | 5 |
| Set 4 | (0, 1), (0, 2), (0, 3), (0, 4), (0, 5), (0, 6) | 0 |
| | (1, 2), (1, 4), (1, 5) | 1 |
| | (2, 5) | 2 |
| | (3, 4), (3, 5) | 3 |
| | (4, 5) | 4 |
| | (6, 1), (6, 2), (6, 3), (6, 4), (6, 5) | 6 |
| Set 5 | (1, 3) | 1 |
| | (2, 3), (2, 4) | 2 |
| | (3, 1), (3, 2) | 3 |
| | (4, 2) | 4 |

Hereinafter, a TDD UE may signify a terminal that transmits/receives a signal to TDD.

i) When Carrier Aggregation (CA) is configured for the TDD UE and different TDD UL-DL configuration values are set (TDD UL-DL configuration) for at least two serving cells, a PCell (i.e., a primary cell) always follows a DL-reference UL-DL configuration having a value identical to that of a TDD UL-DL configuration of the PCell.

ii) When CA is configured for the TDD UE and different TDD UL-DL configuration values are set for at least two serving cells, ii-1) When the above-described pair (PCell, SCell) belongs to set 1, a DL HARQ-timing is applied to a DL-reference UL/DL configuration for an SCell (i.e., a secondary cell), according to a DL-reference UL-DL configuration for set 1. Set 1 has no limit on a scheduling method.

ii-2) Alternatively, when the UE is a terminal supporting self-scheduling, if a pair belonging to set 2 or set 3 is configured, the pair follows a DL-reference UL-DL configuration of set 2 or set 3.

ii-3) Alternatively, when cross-carrier scheduling is configured for the UE (i.e., when the UE is configured to monitor a PDCCH/Enhanced PDCCH (EPDCCH) having a Carrier Indicator Field (CIF)), if a relevant pair corresponds to set 4 or set 5, the relevant pair follows a DL-reference UL-DL configuration of set 4 or set 5.

ii-4) Specifically, when pairs belonging to set 1 satisfy a UE for which a CIF is configured or is not configured, set 1 uses a DL-reference UL-DL configuration in the relevant set 1. In contrast, set 2 and set 3 are applied only for the UE for which the CIF is not configured, and set 4 and set 5 are applied only for the UE for which the CIF is configured.

iii) When CA is configured for the TDD UE and different TDD UL-DL configuration values are set for at least two serving cells, if a DL-reference UL-DL configuration for the at least one serving cell is #5, the UE does not predict that two or more serving cells will be configured.

FIG. 1 is a view illustrating an eIMTA deployment scenario, to which the present invention may be applied.

Scenario 1 is a scenario in which multiple femtocells are deployed at an identical carrier frequency. In scenario 2, multiple femtocells are deployed at an identical carrier frequency, and multiple macrocells are deployed at an adjacent carrier frequency, wherein all of the macrocells may have an identical TDD UL-DL configuration and the femtocells may adjust a TDD UL-DL configuration. In scenario 3, multiple femtocells are deployed at an identical carrier frequency, and are located in outdoor areas. In scenario 4, multiple outdoor picocells are deployed at an identical carrier frequency, and multiple macrocells are deployed at multiple adjacent carrier frequencies, wherein all of the macrocells may have an identical TDD UL-DL configuration and the outdoor picocells may adjust a TDD UL-DL configuration. Accordingly, small cells (e.g., picocells or femtocells) except for the macrocells are capable of changing a dynamic TDD UL-DL configuration.

Hereinafter, a description will be made of a scheme in which reporting configuration information, which may be applied between a relevant BS and a relevant UE, is applied to a dynamic TDD UL-DL in a network (a network environment to which a dynamic TDD UL-DL configuration or reconfiguration is applied) in which eIMTA is configured according to an embodiment of the present invention. Reporting information, to which the reporting configuration information is to be applied, may be a CQI/PMI or an RI. The reporting configuration information may be identically applied to a CQI/PMI or an RI. A method and an apparatus for adaptively performing periodic CQI/PMI or RI reporting will be described.

Figure 2:
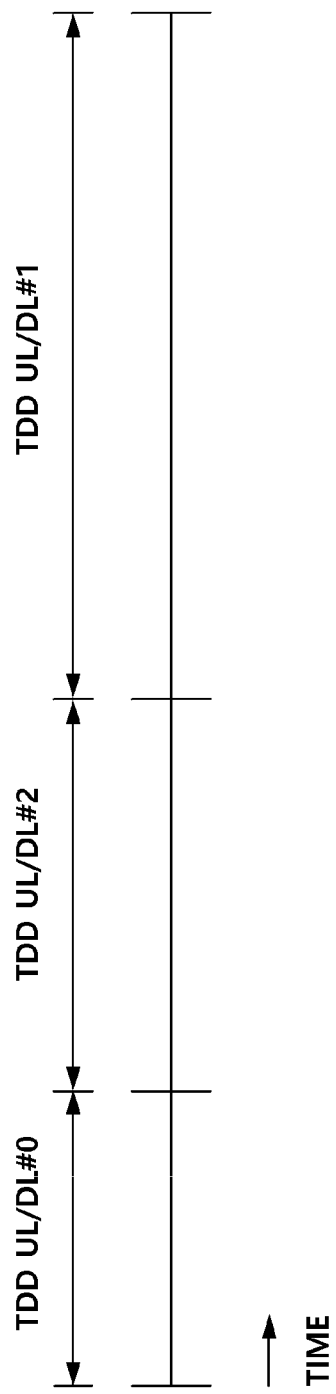
FIG. 2 is a view illustrating a dynamic TDD UL-DL configuration.

FIG. 2 is a view illustrating a dynamic TDD UL-DL configuration.

FIG. 2 illustrates that a TDD UL-DL configuration for an eIMTA capable UE may be quickly changed as represented by #0, #1, and #2 in a unit of tens of milliseconds according to signaling by an eNB. However, it is problematic to intactly utilize an existing reporting method in an environment illustrated in FIG. 2. This configuration will be described with reference to FIG. 3.

Figure 3:
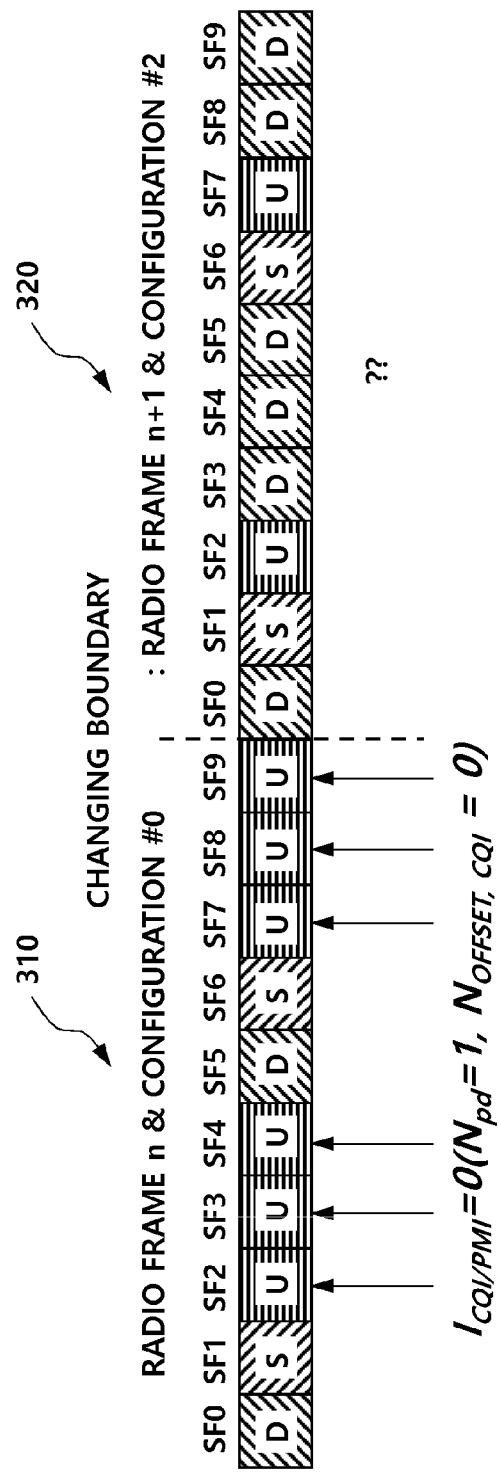
FIG. 3 is a view illustrating a case where a reporting problem arises in the situation of a dynamic TDD UL-DL configuration.

FIG. 3 is a view illustrating a case where a reporting problem arises in the situation of a dynamic TDD UL-DL configuration.

When the above-described method for periodic CQI/PMI reporting (TDD) is intactly applied to eIMTA (i.e., a dynamic TDD UL-DL configuration change), a case occurs in which periodic CQI/PMI reporting is not capable of being performed according to a particular TDD UL-DL configuration. A radio frame n indicated by reference numeral 310 of FIG. 3 has a TDD UL-DL configuration of 0, and reporting configuration information $I_{CQI/PMI}$ to be applied to the radio frame n is set to have 0. $I_{CQI/PMI}=0$ signifies a case where $N_{pd}$ is equal to 1 and $N_{OFFSET, CQI}$ is equal to 0. The reporting configuration information may be set to RRC. When, after the radio frame n, a radio frame n+1 is dynamically changed to a TDD UL-DL configuration #2 as indicated by reference numeral 320, periodic CQI/PMI reporting may not be performed. Specifically, the TDD UL-DL configurations are different before and after a changing boundary between the radio frame n indicated by reference numeral 310 and the radio frame n+1 indicated by reference numeral 320. Accordingly, when reporting configuration information identical to that of the radio frame (the radio frame 310) before the boundary is applied to the radio frame 320, the radio frame 320 is different from the radio frame 310 with respect to a UL-DL subframe configuration within a radio frame, and thus, reporting may not be properly performed, so that there is a need for a solution thereto.

Hereinafter, a description will be made of first and second methods for performing periodic reporting when a TDD UL-DL configuration is dynamically changed. Changing of the TDD UL-DL configuration may include changing, by a BS, a TDD UL-DL configuration of a cell; and indicating, by the BS, the changing of the TDD UL-DL configuration to a UE, and the UE may change the TDD UL-DL configuration according to the indication from the BS or at a pre-agreed time point. Hereinafter, the changing of the TDD UL-DL configuration includes all of the processes.

A first method: a method for previously configuring information required for reporting so as to be applicable to each TDD UL-DL configuration.

It is possible to previously configure and use CQI/PMI reporting information applicable to each TDD UL-DL configuration or each TDD UL-DL configuration set. A particular reporting indicator I_CQI/PMI may be mapped to each TDD UL-DL configuration or each TDD UL-DL configuration set. CQI/PMI reporting information may include information on a CQI/PMI reporting periodicity and a CQI/PMI reporting offset. The previously-configured information may be shared (higher layer signaling) by the BS and the UE, and when the BS changes a TDD UL-DL configuration, the UE may use reporting information corresponding to the changed TDD UL-DL configuration. When the TDD UL-DL configuration is changed, the UE may perform periodic CQI/PMI reporting on the basis of reporting information corresponding to a reporting indicator mapped to the changed TDD UL-DL configuration.

A first method may indicate values of $I_{CQI/PMI\_i}$ ($N_{pd\_i}$, $N_{OFFSET, CQI\_i}$), which is reporting configuration information that a TDD UL-DL configuration capable of being configured for an eIMTA capable UE may apply, to each TDD UL-DL configuration or each set of TDD UL-DL configurations. Here, the value of i may be equal to 7 which is the number of all of the current TDD UL-DL configurations, or less. Also, as the number of TDD UL-DL configurations increases, the value of i may increase. Therefore, the values of $I_{CQI/PMI\_i}$ which is multiple pieces of reporting configuration information may be indicated to the eIMTA capable UE for periodic CQI/PMI reporting. It is possible to dynamically change periodic CQI/PMI reporting suitable for an actual TDD UL-DL configuration, which is dynamically changed, through the indicated values of $I_{CQI/PMI\_i}$. The dynamic TDD UL-DL configuration change is capable of being applied through a PDCCH or an EPDCCH.

For example, multiple pieces of $I_{CQI/PMI}$, which are capable of being configured for each of all available TDD UL-DL configurations, may be signaled to one eIMTA capable UE.

A periodicity of periodic CQI/PMI reporting is set by the BS on the basis of the scheme. An example of reporting configuration information to be configured according to TDD UL-DL will be described below.

When the BS changes the TDD UL-DL configuration, the UE connected to the relevant BS previously has the reporting configuration information which is matched to the changed TDD UL-DL configuration, and thus, the UE may adaptively apply the reporting configuration information to the change of a TDD UL-DL in a cell.

When a TDD UL-DL configuration is {0, 3, 4}, reporting configuration information may be configured as $I_{CQI/PMI\_0}=0$ ($N_{pd\_0}=1$, $N_{OFFSET, CQI\_0}=0$). In this case, a CQI/PMI reporting indicator, namely, reporting configuration information, may be mapped to 0 with respect to {0, 3, 4} which is a set of TDD UL-DL configuration values. Here, each number of {0, 3, 4} signifies a TDD UL-DL configuration value. A CQI/PMI reporting periodicity and a CQI/PMI reporting offset may be configured to respectively have 1 and 0 for the UE on the basis of the mapped CQI/PMI reporting indicator 0.

Specifically, when the TDD UL-DL configuration is changed to one configuration value of {0, 3, 4} according to an indication from the BS, the UE performs periodic CQI/PMI reporting which is based on the CQI/PMI reporting indicator 0.

When a TDD UL-DL configuration is {1, 2}, reporting configuration information may be configured as $1 \leq I_{CQI/PMI\_1} \leq 5(N_{pd\_1}=5, I_{CQI/PMI\_1}-1)$, and one of values within the range may be designated and the relevant value may be used as reporting configuration information. In this configuration, a CQI/PMI reporting indicator, namely, reporting configuration information, is set to one of values of 1 to 5 with respect to {1, 2} which is a set of TDD UL-DL configuration values, and the value is previously signaled by using a higher layer. For example, the reporting configuration information may be set to a value of 1. When the TDD UL-DL configuration is changed according to an indication from the BS, if the TDD UL-DL configuration is the values of {1, 2}, the UE may perform reporting by applying "1" which is the signaled reporting configuration information. When a CQI/PMI reporting indicator is applied which is an example of the reporting configuration information, a periodicity is equal to 5 and an offset is equal to 0.

When a TDD UL-DL configuration is {5, 6}, reporting configuration information may be configured as $16 \leq I_{CQI/PMI\_2} \leq 35(N_{pd\_2}=20, I_{CQI/PMI\_2}-16)$, and one of values within the range may be designated and the relevant value may be used as reporting configuration information. Similarly, when the value of the TDD UL-DL configuration is equal to 5 or 6, reporting configuration information, that the UE is to use, may be set to one (e.g., 20) of values of 16 to 35 by the BS, and may be indicated through higher layer signaling. In this case, when the TDD UL-DL configuration is 5 or 6 according to an indication from the BS, the UE may perform CQI/PMI reporting by applying the reporting configuration information of 20 and by using a periodicity of 20 and an offset of 4.

Figure 4:
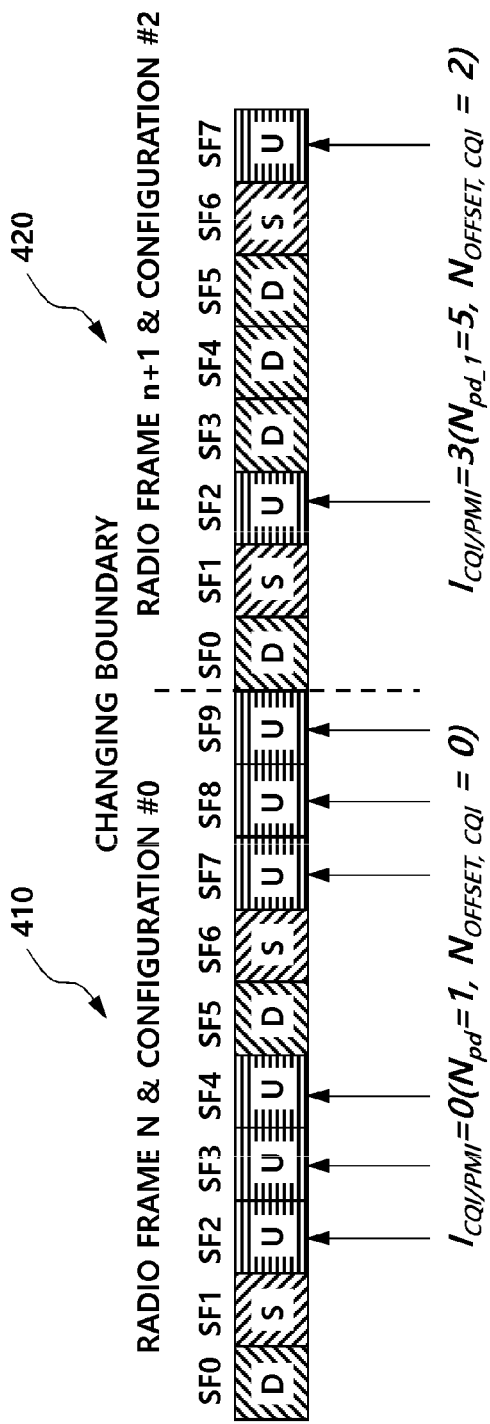
FIG. 4 is a view illustrating a case where information required for reporting is configured when a first method according to the present invention is applied.

FIG. 4 is a view illustrating a case where information required for reporting is configured when the first method according to the present invention is applied. When wideband CQI/PMI reporting is configured, a reporting instance occurs in a UL subframe satisfying $(10 \times n_f + \lfloor n_s/2 \rfloor - N_{OFFSET,CQI}) \mod(N_{pd}) = 0$ which is Equation 1.

Referring to FIG. 4, a radio frame indicated by reference numeral 410 has a TDD UL-DL configuration of 0, and thus, a reporting mode is set to $I_{CQI/PMI}=0$ ($N_{pd}=1$, $N_{OFFSET,CQI}=0$). A radio frame indicated by reference numeral 420 has a TDD UL-DL configuration of 2, and thus, a reporting mode is set to $I_{CQI/PMI}=3$ ($N_{pd\_1}=5$, $N_{OFFSET,CQI}=2$). When the BS maintains the TDD UL-DL configuration to be 0 and changes the TDD UL-DL configuration to 2, the UE performs reporting by applying 0 and 3 which are two pieces of reporting configuration information respectively corresponding to the TDD UL-DL configuration of 0 and the TDD UL-DL configuration of 2.

Sets of the TDD UL-DL configuration values may be variously configured within an available range.

A second method: configures TDD based on a DL reference timing.

A DL reference timing may be applied in order to perform a continuous DL/UL HARQ operation during a dynamic TDD configuration, and $I_{CQI/PMI}$ capable of supporting periodic CQI/PMI reporting may be indicated based on the DL reference timing.

More specifically, another periodic CQI/PMI reporting method may be considered according to a method of how to indicate a timing with a DL reference timing as a reference. In the present invention, the DL reference timing is considered as a reference, but the present invention is not limited thereto.

2-1 Case: A DL-Reference UL-DL Configuration by Higher Layer Signaling

In this case, a DL HARQ operation is performed according to a DL reference timing, which has been set by a higher layer, regardless of a change of an actual TDD UL-DL configuration. It goes without saying that a DL reference timing, which is suitable for an actual TDD UL-DL configuration, may be set and the BS may determine a DL reference timing, which is desired to be set, through a separate process. Also, here, there are two different application ranges. Firstly, i) a configured DL-reference UL-DL configuration may be applied to all subframes, or secondly, ii) a DL-reference UL-DL configuration may be applied to only boundary radio frames in which a TDD UL-DL configuration is changed.

A BS indicates, to an eIMTA capable UE, additional reporting configuration information (e.g., the value of $I_{CQI/PMI}$), which is based on a DL-reference UL-DL configuration required for an eIMTA operation, together with the DL-reference UL-DL configuration. Accordingly, the BS determines the value of $N_{pd}$, which is applicable according to a TDD UL-DL configuration in the current standards, on the basis of a DL-reference UL-DL configuration, and indicates the value of $I_{CQI/PMI}$, which corresponds to the determined value of $N_{pd}$, to the eIMTA capable UE. Another example of the reporting configuration information may also include $I_{RI}$, and the two types of indication values may be configured within one information element.

Figure 5:
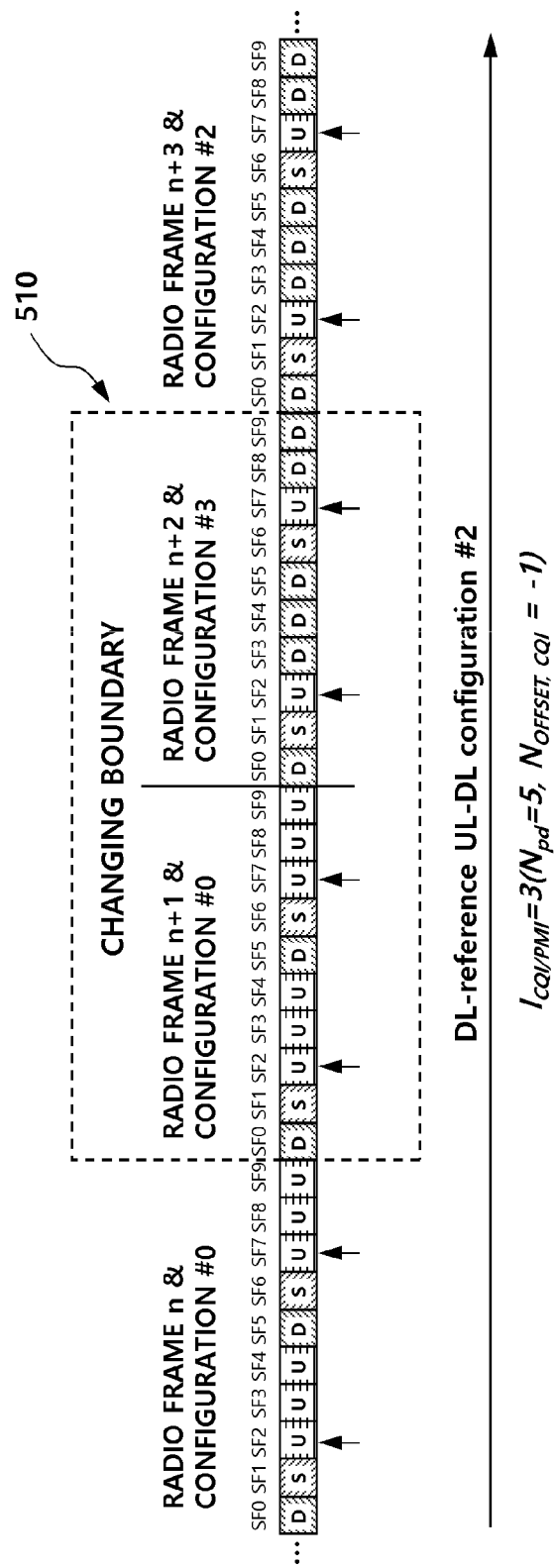
FIG. 5 is a view illustrating the application of an embodiment of the present invention.

FIG. 5 is a view illustrating the application of an embodiment of the present invention.

FIG. 5 illustrates an example of a case to which i) a DL-reference UL-DL configuration, that a higher layer signals, is applied to all of the subframes in the 2-1 case. FIG. 5 illustrates a reporting time period (boundary radio frames) to which a DL-reference UL-DL configuration #2, that the higher layer configures, may be applied. 3 (which corresponds to $N_{pd}$=5), which is the value of additionally-indicated $I_{CQI/PMI}$ which is based on the configured DL-reference UL-DL configuration, is applied to the boundary radio frames. As another example, a relevant DL-reference UL-DL configuration and $I_{CQI/PMI}$ ($N_{pd}$=5) may be applied to only the boundary radio frames indicated by reference numeral 510.

Although a DL-reference UL-DL configuration is considered as a reference indicating the above-described value of $I_{CQI/PMI}$, in this regard, the value of $I_{CQI/PMI}$ may be set with subframes all having a common UL subframe as a reference.

2-2 Case: A DL-Reference UL-DL Configuration According to an Implicit or Fixed Scheme In this case, a method is provided for selecting a DL-reference UL-DL configuration which is applicable according to a change of an actual TDD UL-DL configuration. The method is a scheme for selecting a DL DL-UL reference timing, which may be applied to an SCell, according to TDD UL-DL configurations of a PCell and an SCell, and in eIMTA, enables an appropriate DL-reference UL-DL configuration to be selected according to TDD UL-DL configurations before and after a boundary radio frame, in which an actual TDD UL-DL configuration is changed, in the boundary radio frame. Accordingly, in the 2-2 case, the selected DL-reference UL-DL configuration may be applied to only a boundary radio frame.

In the 2-2 case, the above-described first method may be applied. The application of the second method and that of the first method in the 2-2 case are only different from each other with respect to the position of a subframe to which a DL-reference UL-DL configuration is applied, and there is no difference between the application of the second method and that of the first method in the 2-2 case.

In order to perform reporting by using the second method, the UE may operate as follows.

The value of a periodicity, which is to be applied to a serving cell c for periodic CQI/PMI reporting in TDD, may be determined according to a DL-reference UL-DL configuration of a PCell. When DL-reference UL-DL configurations of the PCell are {0, 1, 3, 4, 6}, a reporting periodicity may be set to be $N_{pd}$=1. In this case, the reporting periodicity is equal to 1 ms, and thus, CQI/PMI reporting is performed in all of the UL subframes.

Meanwhile, when DL-reference UL-DL configurations of the PCell are {0, 1, 2, 6}, the reporting periodicity may be set to be $N_{pd}$=5. Alternatively, the reporting periodicities may be set to be $N_{pd}$={10, 20, 40, 80, 160} regardless of the DL-reference UL-DL configuration of the PCell.

Table 6 below describes a configuration of CQI-ReportPeriodic of CQI-ReportConfig information elements required to indicate $I_{CQI/PMI}$ and $I_{RI}$ in the case of RRC signaling as an embodiment for implementing the present invention.

TABLE 6

Configuration of CQI-ReportPeriodic

```
CQI-ReportPeriodic ::=      CHOICE {
    release                 NULL,
    setup                   SEQUENCE {
        cqi-PUCCH-ResourceIndex     INTEGER (0..1165),
        cqi-pmi-ConfigIndex         INTEGER (0..1023),
        cqi-FormatIndicatorPeriodic CHOICE {
            widebandCQI             NULL,
            subbandCQI              SEQUENCE {
                k                   INTEGER (1..4)
            }
        },
        ri-ConfigIndex              INTEGER (0..1023)
                                    OPTIONAL, -- Need OR
        simultaneousAckNackAndCQI   BOOLEAN
    }
}
``` cqi-pmi-ConfigIndex is a parameter which indicates $I_{CQI/PMI}$, and ri-ConfigIndex is a parameter which indicates $I_{RI}$. CQI-ReportPeriodic, which includes the two parameters, represents RRC signaling, and multiple RRC signalings may be configured for each carrier. Multiple values of $I_{CQI/PMI\_i}$ (0<i<7) may indicate values corresponding to all TDD UL-DL configurations.

Figure 6:
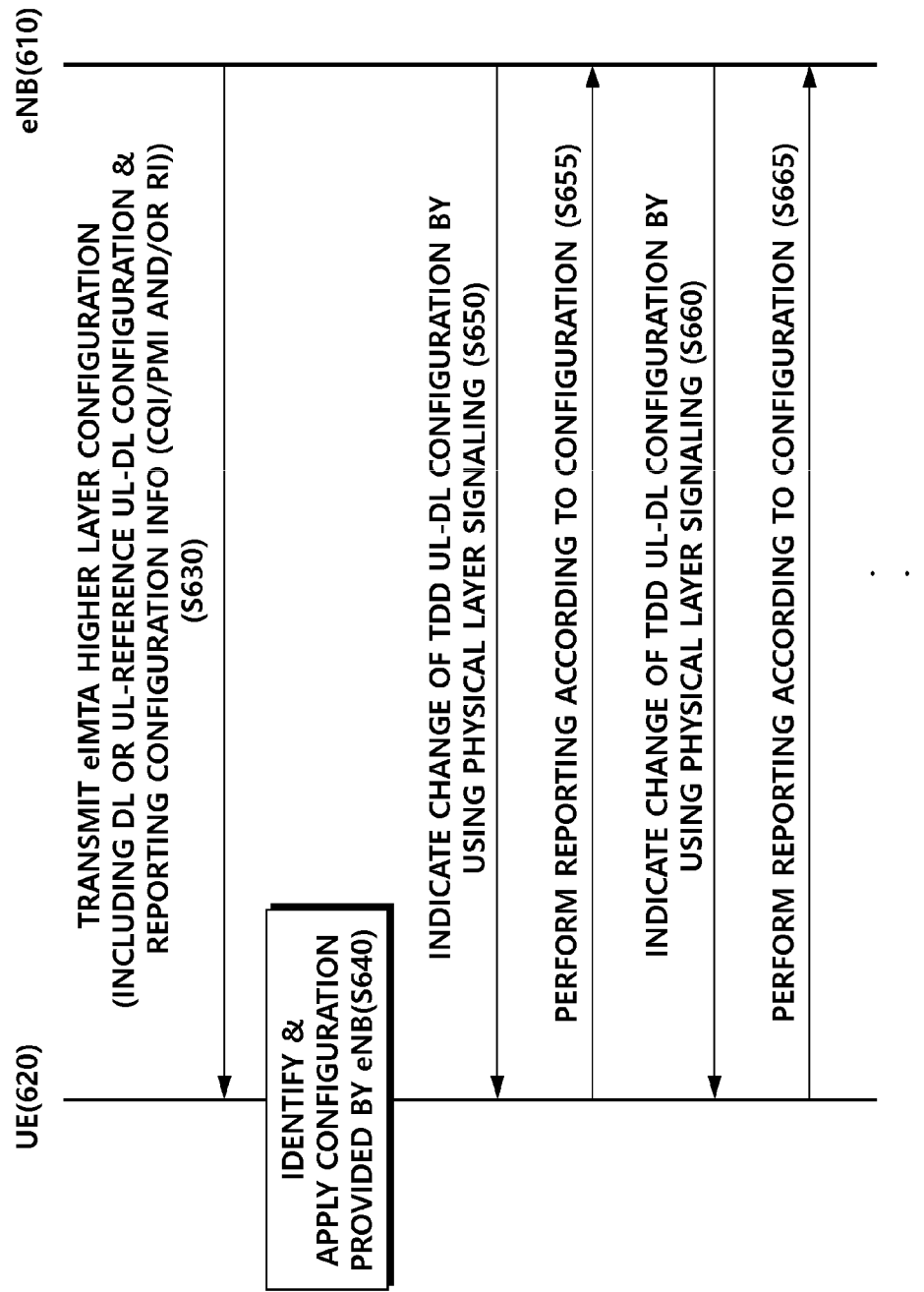
FIG. 6 is a view illustrating operations between a base station and a user equipment according to an embodiment of the present invention.

FIG. 6 is a view illustrating operations between a BS and a UE according to an embodiment of the present invention. Referring to FIG. 6, in step S630, the eNB 610, which is a BS, transmits eIMTA higher layer configuration information to the UE 620. The configuration information includes a DL or UL-reference UL-DL configuration and reporting configuration information. The reporting configuration information includes CQI/PMI reporting configuration information and/or RI reporting configuration information. At this time, the UL-DL configuration may include applicable reporting configuration information, and multiple UL-DL configurations may also include one applicable piece of reporting configuration information, as described above. Alternatively, DL-reference UL-DL reporting configuration information, which is not a TDD UL-DL configuration, may be included, and in this regard, the above-described DL-reference UL-DL configuration also corresponds to a TDD UL-DL configuration. Accordingly, a scheme for transmitting the reporting configuration information may be implemented as in the case of a TDD UL-DL configuration.

In step S640, the UE 620 identifies and applies the configuration provided by the eNB 610. At this time, the UE 620 applies periodic CQI/PMI reporting or periodic RI reporting by applying an embodiment of the present invention. In this regard, the UE 620 may apply pieces of reporting configuration information corresponding to all of the TDD UL-DL configurations as in the above-described first method, or may apply reporting configuration information corresponding to a DL-reference UL-DL configuration as in the second method.

Thereafter, in steps S650 and S660, the eNB 610 indicates, to the UE 620, a change of a TDD UL-DL configuration by using physical layer signaling. In steps S655 and S665, the UE 620 performs reporting by applying a reporting periodicity and a reporting offset, which correspond to the relevant reporting configuration information, according to the change.

The UE 620 may apply reporting configuration information corresponding to the TDD UL-DL configuration as in the above-described first method, or may identify a DL-reference UL-DL configuration by using the TDD UL-DL configuration and may apply reporting configuration information corresponding to the identified DL-reference UL-DL configuration, as in the second method. In the case of the second method, the UE 620 may apply the reporting configuration information to all of the TDD UL-DL configurations, or may apply the reporting configuration information to boundary radio frames in which a UL-DL configuration is changed.

Figure 7:
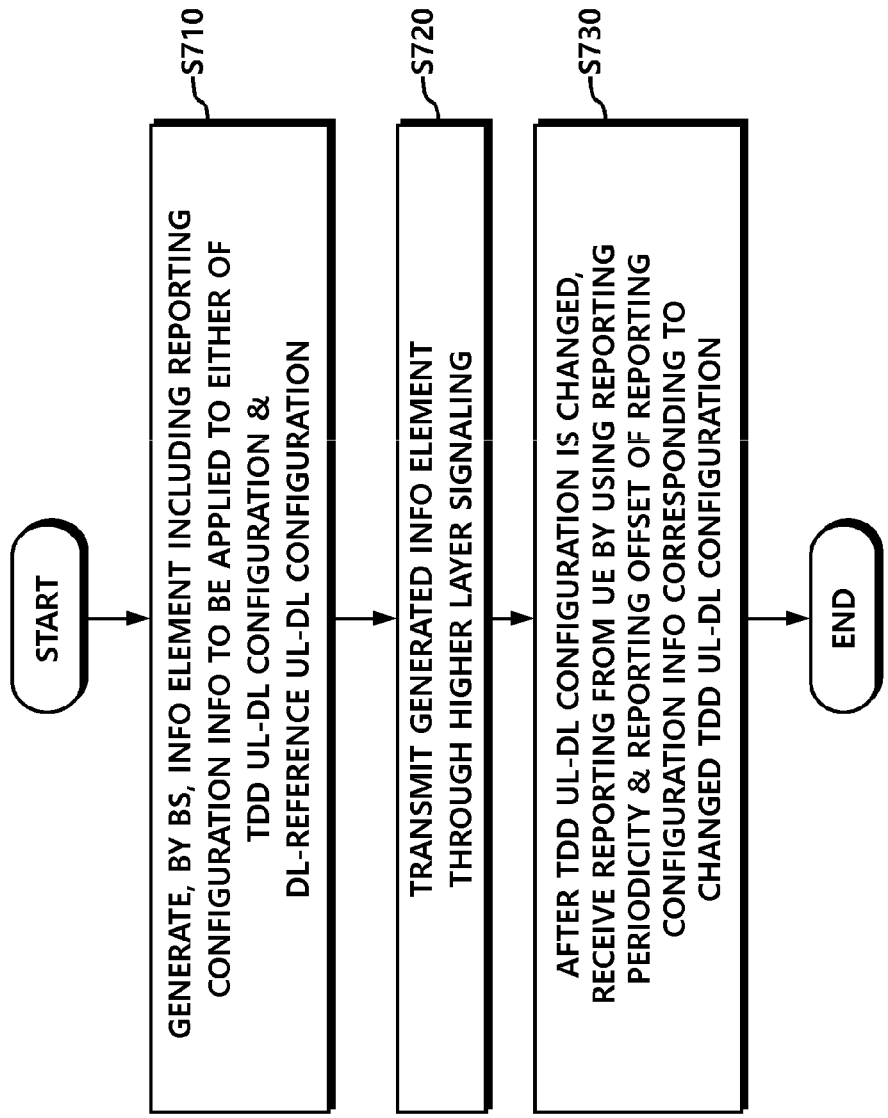
FIG. 7 is a view illustrating a process for controlling adaptive reporting by a base station in a TDD environment according to an embodiment of the present invention.

FIG. 7 is a view illustrating a process for controlling adaptive reporting by a BS in a TDD environment according to an embodiment of the present invention.

In step S710, the BS generates an information element including reporting configuration information to be applied to either of a TDD UL-DL configuration and a DL-reference UL-DL configuration. Next, in S720, the BS transmits the generated information element through higher layer signaling. In step S730, after the TDD UL-DL configuration is changed, the BS receives reporting from the UE by using a reporting periodicity and a reporting offset of the reporting configuration information corresponding to the changed TDD UL-DL configuration. Both the reporting configuration information corresponding to the TDD UL-DL configuration and reporting configuration information corresponding to a DL-reference UL-DL configuration derived from the TDD UL-DL configuration may be applied as embodiments of the present invention.

The change may be performed according to an indication from the BS, or may be performed according to an indication from another BS, a Remote Radio Head (RRH), or the like that is controlled by the BS or cooperates with the BS. Alternatively, the change may be performed without a separate indication at a time point which is agreed upon with the UE so as to have predetermined time intervals. The examples of the change are not limited to the description.

More specifically, in order to implement the above-described first method as an embodiment of the present invention, the information element includes one or more pieces of reporting configuration information to be applied to one or more TDD UL-DL configurations. That is, one piece of reporting configuration information, which is applicable to one or more TDD UL-DL configurations, may exist, and the multiple pieces of reporting configuration information may exist in association with the number of multiple TDD UL-DL configurations. For example, $I_{CQI/PMI\_i}$ or $I_{RI\_i}$, which is one piece of reporting configuration information, may be configured for each TDD UL-DL configuration represented by i, a UL-DL configuration may be configured as a set represented by i, and $I_{CQI/PMI\_i}$ or $I_{RI\_i}$ may be configured which is reporting configuration information applied to the set i.

Meanwhile, in the second method, reporting configuration information may be reporting configuration information applied to a DL-reference UL-DL configuration. In this case, reception step S730 may be implemented such that the BS receives reporting from the UE by using a reporting periodicity and a reporting offset of the reporting configuration information corresponding to a DL-reference UL-DL configuration identified based on the TDD UL-DL configuration. For example, when a UL-DL configuration of an SCell is 2, a UL-DL configuration of a PCell is 2, and the UL-DL configuration of the SCell and that of the PCell correspond to set 1, if Table 5 is applied, a DL-reference UL-DL configuration is 2. The BS receives reporting from the UE by using a reporting periodicity and a reporting offset which are indicated by $I_{CQI/PMI}$ or $I_{RI}$ which is reporting configuration information corresponding to a configuration of 2.

A method which uses the reporting configuration information of the DL-reference UL-DL configuration may be applied to all of the radio frames or may be applied to only a boundary radio frame, as described above with reference to FIG. 5. In this case, in reception step S730, the BS may receive reporting from the UE by using a reporting periodicity and a reporting offset of the reporting configuration information corresponding to a DL-reference UL-DL configuration identified based on the TDD UL-DL configuration in the boundary radio frame.

Also, a DL-reference UL-DL configuration may be selected according to the implicit or fixed scheme as described in the 2-2 case. In this case, in reception step S730, the BS receives reporting from the UE according to reporting configuration information determined according to TDD UL-DL configurations before and after the change. The determined reporting configuration information is configured according to the implicit or fixed scheme between the BS and the UE, and thus a DL-reference UL-DL configuration, to which the reporting configuration information is to be applied, may be predetermined in a network design process, or may be predetermined in such a manner that the BS possesses various selection items and signals a particular selection item to UEs.

Figure 8:
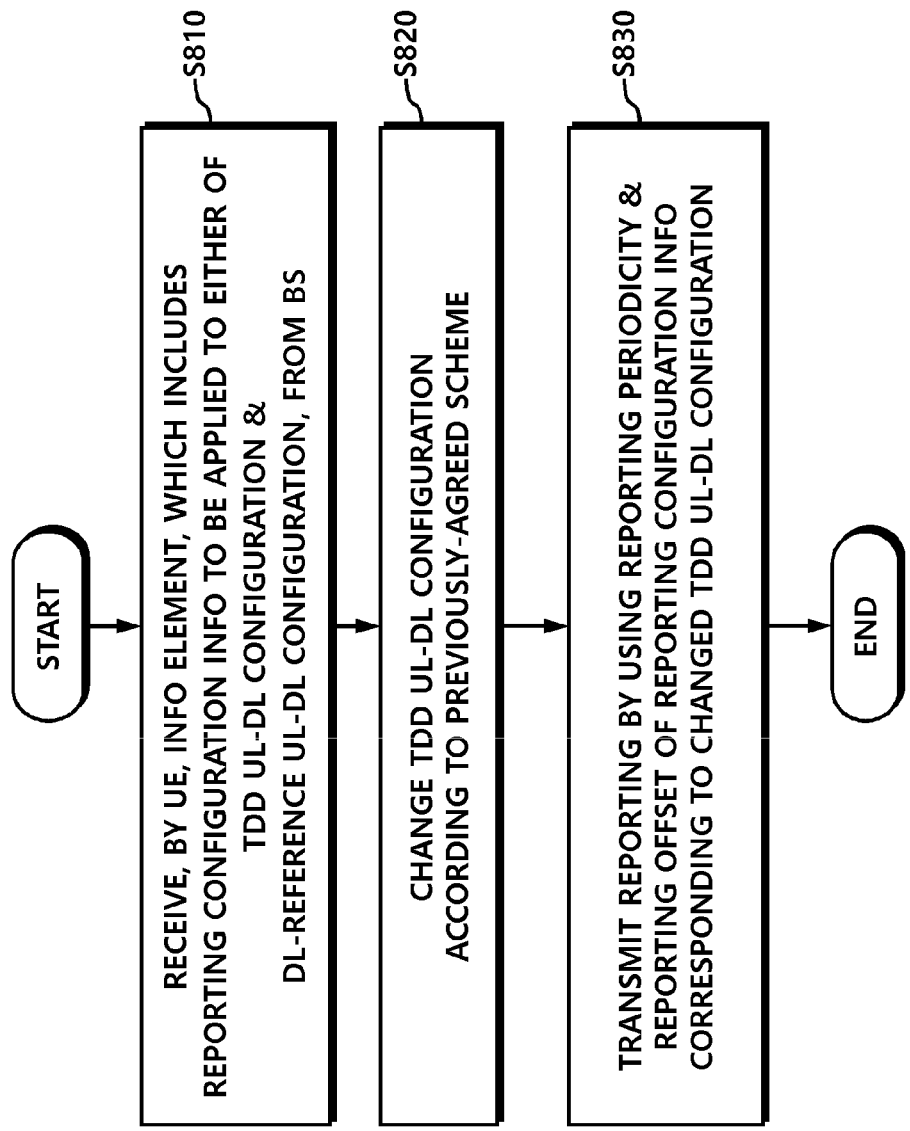
FIG. 8 is a view illustrating a process for controlling adaptive reporting by a user equipment in a TDD environment according to an embodiment of the present invention.

FIG. 8 is a view illustrating a process for controlling adaptive reporting by a UE in a TDD environment according to an embodiment of the present invention.

In step S810, the UE receives an information element, which includes reporting configuration information to be applied to either of a TDD UL-DL configuration and a DL-reference UL-DL configuration, from the BS through higher layer signaling. Then, after the TDD UL-DL configuration is changed according to a previously-agreed scheme in step S820, in step S830, the UE transmits reporting by using a reporting periodicity and a reporting offset of the reporting configuration information related to a DL-reference UL-DL configuration corresponding to the changed TDD UL-DL configuration or the changed TDD UL-DL. Both the reporting configuration information corresponding to the TDD UL-DL configuration and reporting configuration information corresponding to a DL-reference UL-DL configuration derived from the TDD UL-DL configuration may be applied as embodiments of the present invention.

The change may be performed according to an indication from the BS, or may be performed according to an indication from another BS, an RRH, or the like that is controlled by the BS or cooperates with the BS. Alternatively, the change may be performed without a separate indication at a time point which is agreed upon with the BS so as to have predetermined time intervals. The examples of the change are not limited to the description.

More specifically, in order to implement the above-described first method as an embodiment of the present invention, the information element includes one or more pieces of reporting configuration information to be applied to one or more UL-DL configurations. That is, one piece of reporting configuration information, which is applicable to one or more TDD UL-DL configurations, may exist, and the multiple pieces of reporting configuration information may exist in association with the number of multiple TDD UL-DL configurations. For example, $I_{CQI/PMI\_i}$ or $I_{RI\_i}$, which is one piece of reporting configuration information, may be configured for each TDD UL-DL configuration represented by i, a TDD UL-DL configuration may be configured as a set represented by i, and $I_{CQI/PMI\_i}$ or $I_{RI\_i}$ may be configured which is reporting configuration information applied to the set i.

Meanwhile, in the second method, reporting configuration information may be reporting configuration information applied to a DL-reference UL-DL configuration. In this case, transmission step S830 may be implemented such that the UE transmits reporting by using a reporting periodicity and a reporting offset of the reporting configuration information corresponding to a DL-reference UL-DL configuration identified based on the TDD UL-DL configuration. For example, when a TDD UL-DL configuration of an SCell is 2, a TDD UL-DL configuration of a PCell is 2, and the UL-DL configuration of the SCell and that of the PCell correspond to set 1, if Table 5 is applied, a DL-reference UL-DL configuration is 2. The UE transmits reporting by using a reporting periodicity and a reporting offset which are indicated by $I_{CQI/PMI}$ or $I_{RI}$ which is reporting configuration information corresponding to a configuration of 2.

A method which uses the reporting configuration information of the DL-reference UL-DL configuration may be applied to all of the subframes or may be applied to only subframes within a boundary radio frame, as described above with reference to FIG. 5. In this case, in transmission step S830, the UE may transmit reporting by using a reporting periodicity and a reporting offset of the reporting configuration information corresponding to a DL-reference UL-DL configuration identified based on the TDD UL-DL configuration in the boundary subframes.

Also, a DL-reference UL-DL configuration may be selected according to the implicit or fixed scheme as described in the 2-2 case. In this case, in transmission step S830, the UE transmits reporting according to reporting configuration information determined according to TDD UL-DL configurations before and after the change. The determined reporting configuration information is configured according to the implicit or fixed scheme between the BS and the UE, and thus a DL-reference UL-DL configuration, to which the reporting configuration information is to be applied, may be predetermined in a network design process, or may be predetermined in such a manner that the BS possesses various selection items and signals a particular selection item to UEs.

Figure 9:
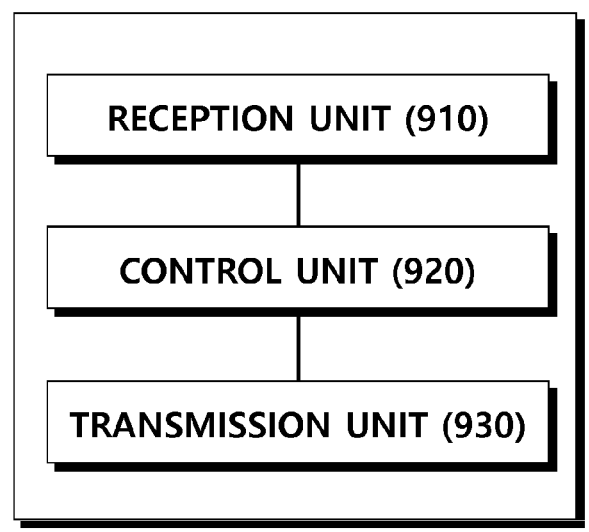
FIG. 9 is a view illustrating a configuration of a base station according to an embodiment of the present invention.

FIG. 9 is a view illustrating a configuration of a BS according to an embodiment of the present invention.

The configuration of the BS 900 is described. The BS 900 includes a control unit 920, a reception unit 910, and a transmission unit 930. The control unit 920 generates an information element which includes reporting configuration information to be applied to either of a TDD UL-DL configuration and a DL-reference UL-DL configuration, and the transmission unit 930 transmits the generated information element through higher layer signaling. The reception unit 910 receives a signal from the UE. After the control unit 920 changes the TDD UL-DL configuration, the control unit 920 may control the reception unit 910 to receive reporting from the UE by using a reporting periodicity and a reporting offset of the reporting configuration information corresponding to the changed TDD UL-DL configuration, and enables the BS to control adaptive reporting in a TDD environment. Both the reporting configuration information corresponding to the TDD UL-DL configuration and reporting configuration information corresponding to a DL-reference UL-DL configuration derived from the TDD UL-DL configuration may be applied as embodiments of the present invention.

The change of the TDD UL-DL configuration may be performed according to an indication from the BS, or may be performed according to an indication from another BS, an RRH, or the like that is controlled by the BS or cooperates with the BS. Alternatively, the change may be performed without a separate indication at a time point which is agreed upon with the UE so as to have predetermined time intervals. The examples of the change are not limited to the description.

More specifically, in order to implement the above-described first method as an embodiment of the present invention, the information element includes one or more pieces of reporting configuration information to be applied to one or more TDD UL-DL configurations. That is, one piece of reporting configuration information, which is applicable to one or more UL-DL configurations, may exist, and the multiple pieces of reporting configuration information may exist in association with the number of multiple TDD UL-DL configurations. For example, $I_{CQI/PMI\_i}$ or $I_{RI\_i}$, which is one piece of reporting configuration information, may be configured for each TDD UL-DL configuration represented by i, a TDD UL-DL configuration may be configured as a set represented by i, and $I_{CQI/PMI\_i}$ or $I_{RI\_i}$ may be configured which is reporting configuration information applied to the set i.

Meanwhile, in the second method, reporting configuration information may be reporting configuration information applied to a DL-reference UL-DL configuration. In this case, the control unit 920 may control the reception unit to receive reporting from the UE by using a reporting periodicity and a reporting offset of the reporting configuration information corresponding to a DL-reference UL-DL configuration identified based on the TDD UL-DL configuration. For example, when a TDD UL-DL configuration of an SCell is 2, a UL-DL configuration of a PCell is 2, and the UL-DL configuration of the SCell and that of the PCell correspond to set 1, if Table 5 is applied, a DL-reference UL-DL configuration is 2. The BS receives reporting from the UE by using a reporting periodicity and a reporting offset which are indicated by $I_{CQI/PMI}$ or $I_{RI}$ which is reporting configuration information corresponding to a configuration of 2.

A method which uses the reporting configuration information of the DL-reference UL-DL configuration may be applied to all of the radio frames or may be applied to only a boundary radio frame, as described above with reference to FIG. 5. In this case, the control unit 920 may control the reception unit to receive reporting from the UE by using a reporting periodicity and a reporting offset of the reporting configuration information corresponding to a DL-reference UL-DL configuration identified based on the TDD UL-DL configuration in the boundary radio frame.

Also, a DL-reference UL-DL configuration may be selected according to the implicit or fixed scheme as described in the 2-2 case. In this case, the control unit 920 controls the reception unit to receive reporting from the UE according to reporting configuration information determined according to TDD UL-DL configurations before and after the change. The determined reporting configuration information is configured according to the implicit or fixed scheme between the BS and the UE, and thus a DL-reference UL-DL configuration, to which the reporting configuration information is to be applied, may be predetermined in a network design process, or may be predetermined in such a manner that the BS possesses various selection items and signals a particular selection item to UEs.

Figure 10:
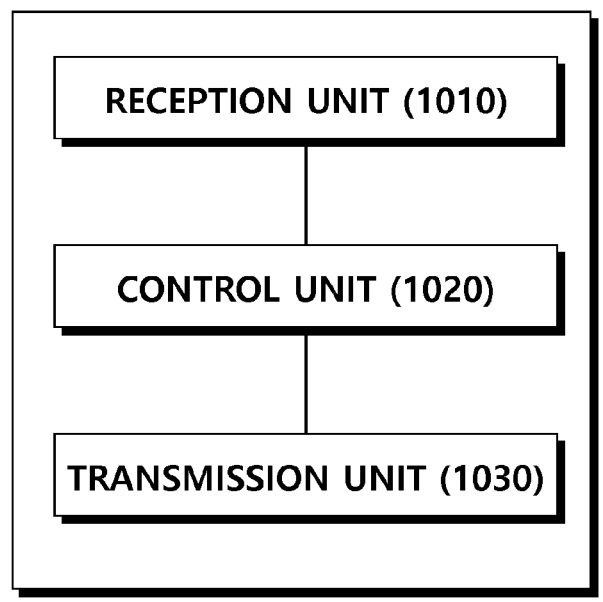
FIG. 10 is a view illustrating a configuration of a user equipment according to an embodiment of the present invention.

FIG. 10 is a view illustrating a configuration of a UE according to an embodiment of the present invention. The configuration of the UE 1000 is described. The UE 1000 includes a control unit 1020, a reception unit 1010, and a transmission unit 1030. More specifically, the reception unit 1010 of the UE receives an information element, which includes reporting configuration information to be applied to either of a TDD UL-DL configuration and a DL-reference UL-DL configuration, from the BS through higher layer signaling. The transmission unit 1030 transmits a signal to the BS. After the TDD UL-DL configuration is changed according to a previously-agreed scheme, the control unit 1020 controls the transmission unit 1030 to transmit reporting by using a reporting periodicity and a reporting offset of the reporting configuration information corresponding to the changed TDD UL-DL configuration. Both the reporting configuration information corresponding to the TDD UL-DL configuration and reporting configuration information corresponding to a DL-reference UL-DL configuration derived from the TDD UL-DL configuration may be applied as embodiments of the present invention.

The change of the TDD UL-DL configuration may be performed according to an indication from the BS, or may be performed according to an indication from another BS, an RRH, or the like that is controlled by the BS or cooperates with the BS. Alternatively, the change may be performed without a separate indication at a time point which is agreed upon with the BS so as to have predetermined time intervals. The examples of the change are not limited to the description.

More specifically, in order to implement the above-described first method as an embodiment of the present invention, the information element includes one or more pieces of reporting configuration information to be applied to one or more TDD UL-DL configurations. That is, one piece of reporting configuration information, which is applicable to one or more TDD UL-DL configurations, may exist, and the multiple pieces of reporting configuration information may exist in association with the number of multiple TDD UL-DL configurations. For example, $I_{CQI/PMI\_i}$ or $I_{RI\_i}$, which is one piece of reporting configuration information, may be configured for each TDD UL-DL configuration represented by i, a TDD UL-DL configuration may be configured as a set represented by i, and $I_{CQI/PMI\_i}$ or $I_{RI\_i}$ may be configured which is reporting configuration information applied to the set i.

Meanwhile, in the second method, reporting configuration information may be reporting configuration information applied to a DL-reference UL-DL configuration. In this case, the control unit 1020 may control the transmission unit 1030 such that the UE transmits reporting by using a reporting periodicity and a reporting offset of the reporting configuration information corresponding to a DL-reference UL-DL configuration identified based on the TDD UL-DL configuration. For example, when a TDD UL-DL configuration of an SCell is 2, a TDD UL-DL configuration of a PCell is 2, and the UL-DL configuration of the SCell and that of the PCell correspond to set 1, if Table 5 is applied, a DL-reference UL-DL configuration is 2. The UE transmits reporting by using a reporting periodicity and a reporting offset which are indicated by $I_{CQI/PMI}$ or $I_{RI}$ which is reporting configuration information corresponding to a configuration of 2.

A method which uses the reporting configuration information of the DL-reference UL-DL configuration may be applied to all of the radio frames or may be applied to only a boundary radio frame, as described above with reference to FIG. 5. In this case, the control unit 1020 may control the transmission unit 1030 to transmit reporting by using a reporting periodicity and a reporting offset of the reporting configuration information corresponding to a DL-reference UL-DL configuration identified based on the TDD UL-DL configuration in the boundary radio frame.

Also, a DL-reference UL-DL configuration may be selected according to the implicit or fixed scheme as described in the 2-2 case. In this case, the control unit 1020 controls the transmission unit 1030 such that the UE transmits reporting according to reporting configuration information determined according to TDD UL-DL configurations before and after the change. The determined reporting configuration information is configured according to the implicit or fixed scheme between the BS and the UE, and thus a DL-reference UL-DL configuration, to which the reporting configuration information is to be applied, may be predetermined in a network design process, or may be predetermined in such a manner that the BS possesses various selection items and signals a particular selection item to UEs.

The above-described reporting configuration information may be transmitted according to a scheme shown in Table 6. In Table 6, "cqi-pmi-ConfigIndex" or "ri-ConfigIndex" may increase according to the number of TDD UL-DL configurations or DL-reference UL-DL configurations, or the number of sets of UL-DL configurations or DL-reference UL-DL configurations. The reconfiguration of a configuration of CQI-ReportPeriodic in a case where K pieces of reporting configuration information are configured is illustrated in FIGS. 11 and 12. A configuration example described below may be an embodiment of the present invention, and when TDD UL-DLs are determined as a set differently from the configuration example, reporting configuration information may be separately combined to the relevant set.

FIGS. 11 and 12 are views each illustrating a configuration example of a CQI-ReportPeriodic according to an embodiment of the present invention.

Referring to FIG. 11, "cqi-pmi-ConfigIndexes" or "ri-ConfigIndexes" to be applied to a k number of UL-DL configurations are included in a configuration example of CQI-ReportPeriodic as indicated by reference numerals 1110 and 1120. k signifies a maximum number which may be set, and cqi-pmi-ConfigIndex_0, cqi-pmi-ConfigIndex_1, ..., cqi-pmi-ConfigIndex_k represent $I_{CQI/PMI\_0}$, $I_{CQI/PMI\_1}$, ..., $I_{CQI/PMI\_k}$, respectively. ri-ConfigIndex_0, ri-ConfigIndex_1, ..., ri-ConfigIndex_k represent $I_{RI\_0}$, $I_{RI\_1}$, ..., $I_{RI\_k}$, respectively.

Referring to FIG. 12, REPORT_ConfigType for each of a k number of report configurations is defined as indicated by reference numeral 1230, and the types indicate multiple pieces of reporting configuration information as indicated by reference numerals 1210 and 1220. As a result, values of $I_{CQI/PMI\_0}$, $I_{CQI/PMI\_1}$, ..., $I_{CQI/PMI\_k}$ configure cqi-pmi-ConfigIndex_r12, and values of $I_{RI\_0}$, $I_{RI\_1}$, ..., $I_{RI\_k}$ configure ri-ConfigIndex_r12.

The embodiments of the present invention relates to the periodic CQI/PMI reporting method and the apparatus for the same, which are more adaptive between the UE, for which an eIMTA technique is configured, and the BS. The method and the apparatus allow periodic CQI/PMI reporting to be supported in eIMTA for controlling interference between the BSs and adaptive traffic in an LTE TDD system. When the present invention is applied, periodic CQI/PMI reporting, which is based on an RRC configuration, can be performed according to a dynamically-changed TDD UL-DL configuration. Specifically, when the above-described BS and UE are implemented, periodic CQI/PMI reporting, which is more adaptive and appropriate, can be smoothly performed according to a dynamically-changed TDD UL-DL configuration.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed:

1. A method for controlling adaptive reporting by a base station in a Time Division Duplexing (TDD) environment, the method comprising:
    transmitting, from the base station to a user equipment a specific selection of a downlink (DL)-reference uplink (UL)-DL configuration for the user equipment via higher layer signaling;
    transmitting an information element including reporting configuration information including a reporting periodicity and a reporting offset of channel status information, from the base station to the user equipment;
    transmitting information on an UL-DL configuration change on a physical downlink control channel (PDCCH), from the base station to the user equipment, wherein the UL-DL configuration change results in a corresponding UL-DL configuration that is different from the DL-reference UL-DL configuration;
    performing UL reception and DL transmission according to the corresponding UL-DL configuration; and
    receiving the channel status information from the user equipment according to the DL-reference UL-DL configuration to which the reporting configuration information is applied.

2. The method as claimed in claim 1, wherein the information element comprises one or more pieces of reporting configuration information, and one piece of reporting configuration information corresponds to one UL-DL configuration.

3. A method for controlling adaptive reporting by a user equipment in a Time Division Duplexing (TDD) environment, the method comprising:
    receiving a specific selection of a downlink (DL)-reference uplink (UL)-DL configuration for the user equipment via higher layer signaling, from a base station by the user equipment via higher layer signaling;
    receiving an information element including reporting configuration information including a reporting periodicity and a reporting offset of channel status information, from the base station by the user equipment;
    receiving information on an UL-DL configuration change on a physical downlink control channel (PDCCH), from the base station by the user equipment;
    performing DL reception and UL transmission according to the corresponding UL-DL configuration; and
    transmitting the channel status information according to the DL-reference UL-DL configuration to which the reporting configuration information is.

4. The method as claimed in claim 3, wherein the information element comprises one or more pieces of reporting configuration information, and one piece of reporting configuration information corresponds to one UL-DL configuration.

5. A base station for controlling adaptive reporting in a Time Division Duplexing (TDD) environment, the base station comprising:
    a controller for generating: 1) a specific selection of a downlink (DL)-reference uplink (UL)-DL configuration for a user equipment, and 2) an information element including reporting configuration information including a reporting periodicity and a reporting offset of channel status information;
    a transmitter for transmitting to the user equipment 1) the specific selection of a downlink (DL)-reference uplink (UL)-DL configuration, wherein the specific selection of a downlink (DL)-reference uplink (UL)-DL configuration is transmitted via higher layer signaling, 2) the generated information element, and 3) information on an UL-DL configuration change of the user equipment; and
    a receiver for receiving a signal from the user equipment, wherein the controller controls the receiver to receive indicator information of the user equipment according to the DL-reference UL-DL configuration to which the reporting configuration information is applied.

6. The base station as claimed in claim 5, wherein the information element comprises one or more pieces of reporting configuration information, and one piece of reporting configuration information corresponds to one UL-DL configuration.

7. A user equipment for controlling adaptive reporting in a Time Division Duplexing (TDD) environment, the user equipment comprising:
    a receiver for receiving, from a base station: 1) a specific selection of a downlink (DL)-reference uplink (UL)-DL configuration for the user equipment, wherein the specific selection of a downlink (DL)-reference uplink (UL)-DL configuration is received via higher layer signaling, 2) an information element including reporting configuration information including a reporting periodicity and a reporting offset of channel status information, and 3) information on an UL-DL configuration change;

a transmitter for transmitting a signal to the base station; and a controller for controlling the transmitter to transmit the channel status information according to the DL-reference UL-DL configuration to which the reporting configuration information is applied.

8. The method of claim 1, wherein the channel status information comprises Channel Quality Indicator.

9. The method of claim 1, wherein the channel status information comprises Precoding Matrix Indicator.

10. The method of claim 1, wherein the higher layer signaling comprises radio resource control signaling.

11. The method of claim 1, wherein said receiving the channel status information from the user equipment occurs after said transmitting information on the UL-DL configuration change.

12. The method of claim 3, wherein the channel status information comprises Channel Quality Indicator.

13. The method of claim 3, wherein the channel status information comprises Precoding Matrix Indicator.

14. The method of claim 3, wherein the higher layer signaling comprises radio resource control signaling.

15. The base station of claim 5, wherein the channel status information comprises Channel Quality Indicator.

16. The base station of claim 5, wherein the channel status information comprises Precoding Matrix Indicator.

17. The base station of claim 5, wherein the higher layer signaling comprises radio resource control signaling.

18. The user equipment of claim 7, wherein the channel status information comprises Channel Quality Indicator.

19. The user equipment of claim 7, wherein the channel status information comprises Precoding Matrix Indicator.

20. The user equipment of claim 7, wherein the higher layer signaling comprises radio resource control signaling.

* * * * *